Figure 1:
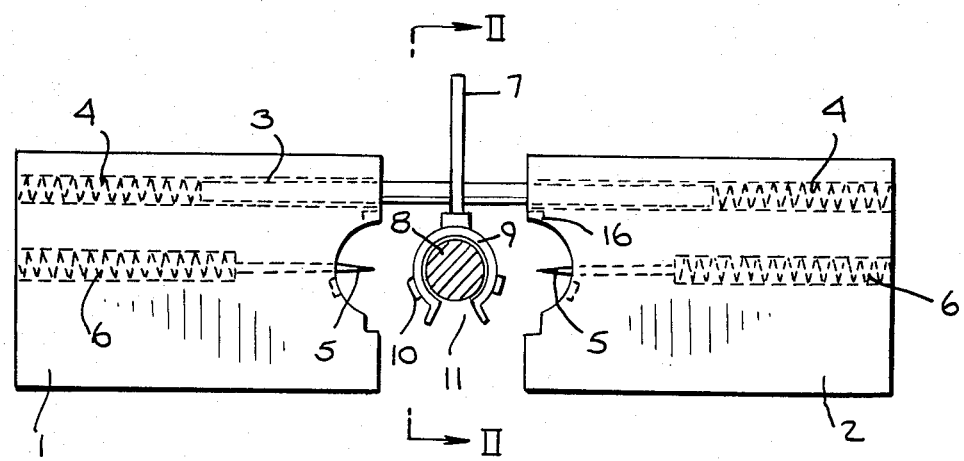

United States Patent [19]
Bredal

[11] Patent Number: 4,527,299
[45] Date of Patent: Jul. 9, 1985

[54] METHOD FOR FORMING AN INTERNAL THREAD IN A HOLLOW BODY

[75] Inventor: Torben Bredal, Gilleleje, Denmark

[73] Assignee: Aktieselkabet J.H. Holm Holding, Ebberup, Denmark

[21] Appl. No.: 540,550

[22] PCT Filed: Feb. 1983

[86] PCT No.: PCT/DK83/00012

§ 371 Date: Oct. 3, 1983

§ 102(e) Date: Oct. 3, 1983

[87] PCT Pub. No.: WO83/02741

PCT Pub. Date: Aug. 18, 1983

[30] Foreign Application Priority Data

Feb. 4, 1982 [DK] Denmark .................. 475/82

[51] Int. Cl.³ .................. B23G 7/00; B21D 53/24
[52] U.S. Cl. .................. 10/152 R; 10/86 F
[58] Field of Search .................. 10/75, 86 F, 129 WH, 10/129 WJ, 139 WH, 139 WJ, 152 R, 152 T

[56] References Cited

U.S. PATENT DOCUMENTS

| | | | |
|---|---|---|---|
| 1,839,476 | 1/1932 | Golrick | 10/139 WH |
| 2,441,580 | 5/1948 | Mageoch | 10/86 |
| 3,668,726 | 6/1972 | Shinjo | 10/129 WJ |

FOREIGN PATENT DOCUMENTS

| | | | |
|---|---|---|---|
| 1195141 | 6/1965 | Fed. Rep. of Germany | 10/139 |
| 144366 | 10/1980 | German Democratic Rep. | 10/152 WJ |
| 877156 | 9/1961 | United Kingdom | 10/139 WH |
| 1043253 | 3/1963 | United Kingdom | |
| 960948 | 5/1963 | United Kingdom | |
| 1366132 | 9/1974 | United Kingdom | 10/129 WJ |

Primary Examiner—E. Michael Combs
Attorney, Agent, or Firm—Kenyon & Kenyon

[57] ABSTRACT

To manufacture a nut, a piece of plate material is bent to form a tube (9) which is placed over a mandrel (8) and clamped together around the mandrel, first by means of a pair of spring-loaded dowels (5) and thereafter by two clamping jaws 1, 2. The mandrel is then withdrawn, and a thread-forming tap (12) rotating in the direction of the thread is pressed in through the tube to produce an internal thread by deformation. When the tap has passed through the tube, the direction of rotation is reversed and the tap is screwed out again, after which the nut is finished. For cooling and lubrication, cutting oil is supplied to the tap before insertion into the tube and possibly to the inside of the tube. Alternatively, a tap with a shank (13) which functions as the mandrel (8) and has a threading piece (14) at one end can be used. After sliding the slotted tube onto the shank, the thread is formed when the tap is turned out of the tube, thereby avoiding having to turn the tap through the tube more than once.

4 Claims, 3 Drawing Figures

U.S. Patent  Jul. 9, 1985  4,527,299

METHOD FOR FORMING AN INTERNAL THREAD IN A HOLLOW BODY

This invention relates to a method for the forming of an internal thread in a hollow body, principally a hollow body formed from a metal plate which is bent around a longitudinal axis to form a tube slotted along its length.

Hitherto known methods of cutting internal threads in articles of a certain length are effected by machining by means of a tap. This demands a certain wall thickness in order for the article to retain adequate strength and, moreover, calls for considerable cleaning of tools and components after the cutting of the thread. A further disadvantage is the long production time, which again in turn means a high cost of manufacture.

Tools for forming an internal thread by means of a thread-forming tap, which is turned in through a hole, are already known within the art. However, these methods are limited to relatively thin workpieces such as plates, in which there is formed a so-called trumpet hole. As soon as the thickness of the workpiece exceeds the diameter of the thread, use must normally be made of thread-cutting taps.

The object of the present invention is to overcome the drawbacks and disadvantages of known methods of thread forming, and this is achieved by a method whereby a workpiece in the form of a tube is introduced over a mandrel which is positioned between a number of clamping jaws in which there is located a yielding dowel, said dowel being pressed in towards the mandrel for fixing the tube, after which the clamping jaws are moved in against the tube on the mandrel and clamp the tube completely together, this taking place before or after the mandrel is drawn out of the tube, whereupon a thread-forming tap rotated in the direction of the thread is turned into the tube to produce the internal thread by deformation, after which the tap is screwed out and the clamping jaws separated to release the tube.

There is thus achieved the possibility of producing a thread by deformation in a tube having a length which can be up to several times the diameter of the thread. By this deformation there is formed a perfect thread while retaining the material's structure and strength. Moreover, the workpiece is hardened by the deformation, thus ensuring a considerable retention of shape even when said workpiece is produced of spring steel. This method enables tubular nuts to be produced both more quickly and inexpensively and with hitherto unknown strength characteristics and shape retention.

In order to achieve the best possible operating conditions, it is expedient, as presented in claim 2, to introduce cutting oil both to the front and possibly to the inside of the tube, hereby also enabling the length/diameter ratio of a workpiece threaded by this method to be considerably increased.

Finally, as presented in claim 3, a method can be used by which the tube is fed in onto a spindle with a thread-forming tap which begins at the shank of the tap, so that the formation of the thread is effected by a single screwing out of the tap. This saves considerable time, in that in opposition to the normal procedure, where the tap must be turned in, its direction of rotation reversed and then turned out again, the tap needs to be turned only one way.

Figure 2:
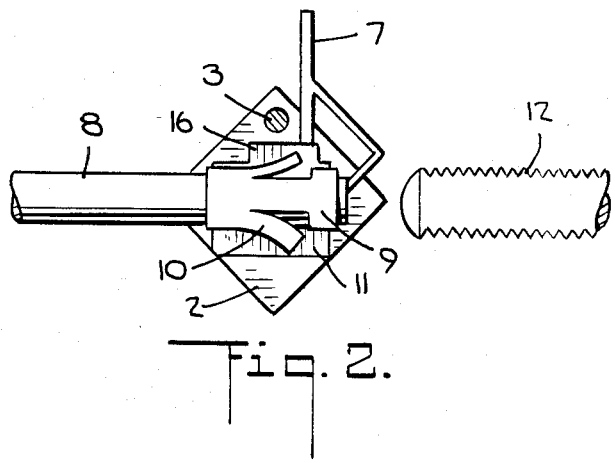
Figure 3:
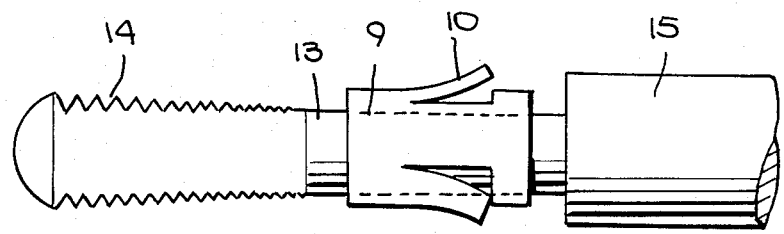

The invention will now be described in greater detail with reference to the accompanying drawing, where FIG. 1 shows the tube introduced into a tool before the formation of the thread, FIG. 2 shows a section seen in the direction II—II in FIG. 1, and FIG. 3 shows the tube introduced over a second embodiment of the thread-forming tap.

FIGS. 1 and 2 show an example of one embodiment of a tool for the execution of the method in accordance with the invention.

The tool consists of two clamping jaws 1, 2, which can slide towards and away from each other while guided by a guide 3, said guide 3 comprising a spindle upon which the jaws can slide against spring pressure from springs 4. The inside faces of the clamping jaws are provided with a recess for the workpiece 9 which is to be securely clamped. Moreover, in said recesses are located one or more dowels 5 which are extended by springs 6, inside the clamping jaws.

In the example shown, the workpiece is produced by rolling a piece of plate material into a tube which is provided in the middle with a number of punched out tabs 10. These tabs serve to anchor the finished tube during its use. For the whole length of the tube there is a slot 11, the edges of which are bent to form lengthwise ribs. The clamping jaws are further provided with recesses 16 to accommodate said tabs.

Extending inside the tool is a mandrel 8 upon which the tube 9 can slide with the slot 11 facing downwards. Opposite this mandrel there is mounted a thread-forming tap 12 which can be inserted into the tube while rotating.

Finally, there is shown a supply pipe having two outlets 7 for delivering high-pressure cutting oil at the front end of the tube and at one of the tube's side holes.

The method will now be described in greater detail. After the plate has been prepared in punching tools, it is conveyed to the mandrel 8, as shown in FIG. 2, where the tube arrives sliding from the left. The clamping jaws 1 and 2 are then moved towards each other, so that the dowels 5 first contact the tube and secure it in the correct position on the mandrel.

When the jaws have closed completely together, the tube is finally fixed and secured, after which the mandrel 8 is drawn out to the left in FIG. 2. The thread-forming tap 12 is inserted from the right as seen in FIG. 2, while at the same time it is made to rotate. The thread is formed during the introduction of the tap into the tube, and when the tap has been fed through the tube, its direction of rotation is reversed and it is turned out again. Simultaneously with this formation of the thread, a hardening of the workpiece takes place and it therefore now remains in this form.

The jaws are now withdrawn from each other, and the tube—now in the form of a nut—falls out of the tool, after which the procedure can be repeated.

By using the tap as shown in FIG. 3, a considerable increase in the production speed can be achieved. The tap is secured to a spindle 15 which can rotate in the direction of the thread while at the same time moving axially, i.e. towards the right in FIG. 3. At the end of the tap is a thread-forming piece 14 which extends from a shank 13, this shank 13 corresponding to the above-mentioned mandrel 8. When the tube is slotted, it can slide in over this shank, after which the jaws can close together around the tube. The tap is then withdrawn to the right in FIG. 3 while rotating, and the formation of the thread takes place at the same time that the tap is "screwed out". In this way the tap needs only to be turned in one direction and moved only once through the tube.

In the example shown, only two jaws are used, but it naturally falls within the scope of the invention to use more than two, in that in some cases advantages can be achieved by the use of three jaws.

In certain cases, where there is no risk of the workpiece turning on the mandrel before the clamping jaws have fixed it in place, the dowels 5 can be omitted.

I claim:

1. A method of forming an internal thread in a hollow cylindrical body formed from a metal plate bent around a longitudinal axis into a tube, with opposite edges of the plate being spaced apart to provide a longitudinal gap therebetween when the tube is unstressed, the method comprising the steps of:
    (a) introducing the tube between at least two clamping jaws, each jaw having a resiliently yieldable member extending inwardly toward a central axis between the jaws;
    (b) moving the jaws radially inward toward the central axis until the resiliently yieldable members supportingly contact the tube to hold said tube coaxially with a tap having a thread-forming head and a supporting shank smaller in diameter than said head;
    (c) moving the clamping jaws axially with respect to the tap to position the tube around the shank of the tap;
    (d) closing the clamping jaws together against the tube to close the longitudinal gap between the spaced apart edges of the tube and to fix the tube in the jaws;
    (e) rotating the tap in a direction to unscrew the tap from the tube;
    (f) withdrawing the thread-forming head of the tap from the tube while the tap is rotating in said direction to unscrew the tap from the tube, thereby forming an internal thread in said tube; and
    (g) opening the clamping jaws to release the tube.

2. A method according to claim 1 wherein step (a) comprises sliding the tube along a mandrel that extends between the clamping jaws coaxially with said central axis, the mandrel having a free end facing the thread forming head of the tap, and the method further comprises withdrawing the mandrel from between the clamping jaws after step (b).

3. A method according to claim 1 wherein the method further comprises supplying cutting oil to the thread-forming head of the tap immediately in front of the tube.

4. A method according to claim 3 wherein the method further comprises supplying cutting oil to the inside of the tube.

* * * * *